US005714073A

United States Patent [19]
Pall et al.

[11] Patent Number: 5,714,073
[45] Date of Patent: *Feb. 3, 1998

[54] METHOD OF FILTERING A PROTEIN-CONTAINING FLUID

[75] Inventors: David B. Pall, Roslyn Estates; Thomas C. Gsell; Colin F. Harwood, both of Glen Cove, all of N.Y.

[73] Assignee: Pall Corporation, East Hills, N.Y.

[*] Notice: The term of this patent shall not extend beyond the expiration date of Pat. No. 5,582,907.

[21] Appl. No.: 429,731

[22] Filed: Apr. 25, 1995

Related U.S. Application Data

[63] Continuation-in-part of Ser. No. 281,772, Jul. 28, 1994, Pat. No. 5,582,907.

[51] Int. Cl.[6] .......................... B01D 61/00; B01D 37/00
[52] U.S. Cl. .......................... 210/651; 210/767; 210/507; 210/500.38; 442/351; 442/400
[58] Field of Search .......................... 210/767, 505, 210/504, 508, 500.27, 500.28, 500.38, 645, 650, 651; 264/45.5; 604/358; 442/351, 400

[56] References Cited

U.S. PATENT DOCUMENTS

| | | |
|---|---|---|
| 3,454,534 | 7/1969 | Crovatt, Jr. . |
| 4,021,281 | 5/1977 | Pall . |
| 4,113,794 | 9/1978 | Thomopson et al. . |
| 4,130,602 | 12/1978 | Thompson . |
| 4,136,133 | 1/1979 | Thompson . |
| 4,297,454 | 10/1981 | Thompson . |
| 4,340,479 | 7/1982 | Pall . |
| 4,523,995 | 6/1985 | Pall et al. . |
| 4,880,548 | 11/1989 | Pall et al. . |
| 4,921,654 | 5/1990 | Hou et al. ................... 264/48 |
| 5,030,710 | 7/1991 | Speranza et al. . |
| 5,137,635 | 8/1992 | Seita et al. .............. 210/500.38 |
| 5,254,668 | 10/1993 | Dominguez et al. . |
| 5,306,536 | 4/1994 | Moretz et al. .............. 604/358 |
| 5,369,179 | 11/1994 | Havens . |
| 5,498,340 | 3/1996 | Granger et al. ............ 210/645 |
| 5,582,907 | 12/1996 | Pall .......................... 428/287 |

FOREIGN PATENT DOCUMENTS

| | | |
|---|---|---|
| 42 37 604 | 5/1994 | Germany . |
| 4237604 | 5/1994 | Germany . |

OTHER PUBLICATIONS

PTO–97–1821 Translation of DE 42 37 604, May, 1994.
Websters Third New International Dictionary, p. 623, 1993.
Kirk–Othmer Concise Encyclopedia of Chemical Technology, pp. 349–350, 1985.
Kerr, "Hydrophilic Nylon," paper presented Mar. 8–9, 1994, Charlotte, NC (Allied Fibers).

*Primary Examiner*—David A. Reifsnyder
*Attorney, Agent, or Firm*—Leydig, Voit & Mayer, Ltd.

[57] ABSTRACT

The present invention provides a filtration method comprising passing a protein-containing solution through a filtration medium comprising a polyamide-polyether copolymer, such as a polyamide/polyalkylene-oxide-diamine, particularly a nylon 6/polyethylene-oxide-diamine copolymer.

36 Claims, No Drawings

METHOD OF FILTERING A PROTEIN-CONTAINING FLUID

CROSS-REFERENCE TO RELATED APPLICATION

This is a continuation-in-part of U.S. patent application Ser. No. 08/281,772, filed July 28, 1994, now U.S. Pat. No. 5,582,907.

TECHNICAL FIELD OF THE INVENTION

The present invention pertains to a method of filtering a protein-containing fluid. In particular, the present inventive method is directed toward the filtering of a protein-containing fluid through a filtration medium such that there is reduced protein binding to the filtration medium.

BACKGROUND OF THE INVENTION

In the filtering of any fluid through a filtration medium, it is desirable to minimize the pore blockage so as to extend the useful life of the filtration medium and so as not to alter the filtration characteristics of the filtration medium in the course of the filtration process. This is a particular problem when the fluid contains proteins inasmuch as proteins are readily adsorbed onto many filtration media, particularly polymeric filtration media. Of course, if the proteins are not intended to be removed from the fluid being tested, not only is the filtration process adversely affected by protein adsorption onto the filtration medium, but the final product is adversely affected, with a loss in protein yield.

While filtration media have been designed which seek to minimize protein adsorption thereon, e.g., nylon membranes with graft polymerized surface coatings exhibiting low protein adsorption, such filtration media can introduce other problems. For example, the surface coating can lead to undesirable extractables and/or alter the pore structure and uniformity of the filtration medium. Similarly, some filtration media are prepared from inherently high protein-adsorbing materials, e.g., polyvinylidene fluoride which has the additional disadvantage that it is not water-wettable and thus poses difficulties in filtering aqueous fluids.

Thus, there remains a need for an improved method of filtering protein-containing fluids which does not suffer from at least some of the disadvantages of conventional techniques. The present invention seeks to provide such a method. These and other objects and advantages of the present invention, as well as additional inventive features, will be apparent from the description of the invention provided herein.

BRIEF SUMMARY OF THE INVENTION

The present invention provides a filtration method comprising passing a protein-containing solution through a filtration medium comprising a polyamide-polyether copolymer, such as a polyamide/polyalkylene-oxide-diamine copolymer, particularly a nylon 6/polyethylene-oxide-diamine copolymer.

DESCRIPTION OF THE PREFERRED EMBODIMENTS

It has been surprisingly discovered that a filtration medium prepared from a polyamide-polyether copolymer, such as a polyamide/polyalkylene-oxide-diamine copolymer, particularly a nylon 6/polyethylene-oxide-diamine copolymer, has remarkably low protein adsorption and is particularly well-suited for filtering a protein-containing fluid. Thus, the present invention provides a filtration method comprising passing a protein-containing solution through a filtration medium comprising, and even more preferably consisting essentially of, a polyamide-polyether copolymer, such as a polyamide/polyalkylene-oxide-diamine copolymer, particularly a nylon 6/polyethylene-oxide-diamine copolymer.

The copolymer can comprise any suitable polyamide, e.g., nylon 6, nylon 12, or nylon 66, along with any suitable polyether, e.g., a polyetheramine such as a polyalkylene-oxide-diamine, preferably wherein the alkylene is a $C_1$–$C_8$ alkylene, and most preferably wherein the alkylene is a $C_2$–$C_4$ alkylene. The polyether portion of the copolymer will typically result from a reaction involving a suitable oxy-containing monomer, e.g., a polyoxyalkylene diamine or polyoxyalkylene amide, or a suitable hydroxyl-containing monomer, e.g., a polyalkylene glycol diamine. The copolymer is preferably a nylon 12/polybutylene-oxide-diamine copolymer and most preferably a nylon 6/polyethylene-oxide-diamine copolymer.

The copolymer can be prepared by any suitable means and can contain any suitable relative amounts of a polyamide and a polyether. The copolymer preferably contains about 75–99 wt. % polyamide and about 1–25 wt. % polyether. More preferably, the copolymer contains about 75–95 wt. % polyamide and about 5–25 wt. % polyether, most preferably about 80–90 wt. % polyamide and about 10–20 wt. % polyether, e.g., about 80–85 wt. % polyamide and 15–20 wt. % polyether.

A nylon 6/polyethylene-oxide-diamine copolymer is commercially available from Allied Signal (Petersburg, Va.) as Hydrofil® Nylon, which is described as containing more than 80% nylon 6 on a molecular weight basis with the remainder being polyethylene-oxide-diamine. This commercially available nylon 6/polyethylene-oxide-diamine is believed to contain about 80–85 wt. % nylon 6 and 15–20 wt. % polyethylene-oxide-diamine.

Other suitable polyamide-polyether copolymers, as well as methods of preparing such copolymers, are disclosed in U.S. Pat. Nos. 3,454,534, 4,113,794, 4,130,602, 4,136,133, 4,297,454, 5,030,710, and 5,254,668.

If desired, the polyamide-polyether copolymer, such as the preferred nylon 6/polyethylene-oxide-diamine copolymer, can be modified so as to impart other desirable characteristics to the copolymer and, thereby, to the filtration medium.

The polyamide-polyether copolymer, such as nylon 6/polyethylene-oxide-diamine copolymer, can be prepared into any suitable filtration medium by any suitable technique. For example, the copolymer can be formed into a membrane in accordance with the process disclosed in U.S. Pat. No. 4,340,479. Similarly, the copolymer can be formed into a fibrous nonwoven web in accordance with the melt-blowing process disclosed in U.S. Pat. No. 4,021,281 or the improved melt-blowing process disclosed in U.S. Pat. No. 54,582,907. Alternatively, the copolymer can be formed into a fibrous nonwoven web in accordance with the conventional Fourdrinier paper making process or in accordance with the process described in U.S. Pat. No. 4,523,995, although it is not desirable to utilize a binder resin in the preparation of such a fibrous nonwoven web inasmuch as such a binder resin could cause undesirable pore blockage and/or lead to undesirable extractables during use.

The filtration medium utilized in conjunction with the present inventive method can have any suitable pore rating.

Typically, the filtration medium will have a pore rating of below about 10 μm, more typically a pore rating of about 0.01 μm to about 5 μm, even more typically a pore rating of about 0.1 μm to about 1 μm. Similarly, the filtration medium, particularly when a fibrous nonwoven web, can have any suitable thickness, e.g., about 0.01–0.1 cm, and can consist of fibers of any suitable diameter, preferably fibers having an average fiber diameter of about 20 μm or less, and more preferably about 10 μm or less. Similarly, such a fibrous nonwoven web can have any suitable voids volume, preferably at least about 60%, and more preferably about 70–90%.

As set forth herein, voids volume is determined from the weight of the sheet per unit area, the density of the fiber, and the thickness of the sheet. Care must be taken with respect to the measurement of the thickness of a fibrous nonwoven web because of the compressibility of the web, which can cause large errors if inappropriate equipment is used. The voids volume values set forth herein were determined using a thickness gauge in which a 7.62 cm diameter aluminum foot is attached to a gauge with 0.000254 cm graduations. The gauge with its foot is mounted on a horizontal U shaped frame comprising on its lower arm a flat surface against which the foot rests. The gauge foot was actuated downward by a 60 gram force spring, which together with the 80 gram weight of the foot exert a compressive force on the test specimen of 140 grams, or 3.1 g/cm$^2$. This force compresses even the loftiest and most easily compressed fibrous nonwoven web by less than about 1%. The voids volume can be then calculated as follows: % voids=$(t-W/\rho)t^{-1} \times 100$, where t=thickness (cm), W =weight (g/cm$^2$), and p=density of the fiber (g/cc).

The filtration medium utilized in the context of the present inventive medium will typically have the same properties throughout the filtration medium, e.g., a layer below the surface of the filtration medium has the same properties as the surface layer of the filtration medium. Such a characteristic is the result of the inherent properties of the copolymer used to form the filtration medium. In contrast, a filtration medium which has been rendered less susceptible to protein adsorption through surface modification techniques, e.g., by grafting a suitable polymer on the surface of a filtration medium which is otherwise highly susceptible to protein adsorption, does not have the same properties throughout the filtration medium, e.g., the surface of the filtration medium differs from that portion of the filtration medium below the surface. As a consequence, any abrasion or minor damage to the surface of the filtration medium utilized in the context of the present invention will typically not cause a change in the protein adsorption characteristics of the filtration medium.

The filtration medium utilized in the context of the present inventive method should be inherently hydrophilic throughout the medium, e.g., the copolymer from which the filtration medium is formed, as well as the filtration medium formed from the copolymer, should have a critical wetting surface tension (CWST) of at least about 72 dynes/cm. Preferably, the filtration medium will have a CWST of at least about 80 dynes/cm, for example, about 80–100 dynes/cm, and more typically about 90–95 dynes/cm. The CWST values set forth herein were determined in the manner described in U.S. Pat. No. 4,880,548.

The fluid being passed through the filtration medium formed from a polyamide-polyether copolymer can be any suitable fluid, generally an aqueous solution. Moreover, the fluid can have any suitable concentration of proteins. The present inventive method is useful in filtering protein-containing fluids when the proteins contained in the fluid are desired to pass through the filtration medium, as well as when the proteins contained in the fluid are to be removed, in whole or in part, from the fluid by way of the filtration medium, e.g., the fluid after being passed through the filtration medium is free of a particular protein(s) or is substantially protein-free.

The following examples further illustrate the present invention and, of course, should not be construed as in any way limiting its scope.

EXAMPLE 1

A series of fibrous nonwoven webs was prepared from a copolymer incorporating about 80–85 wt. % nylon 6 and about 15–20 wt. % polyethylene-oxide-diamine in accordance with the melt-blowing procedure disclosed in Example 1 of U.S. Pat. No. 5,582,907. Specifically, the nylon 6/polyethylene-oxide-diamine copolymer was melt-blown from a fiberizer assembly comprising two fiberizers each with 21 fiberizing nozzles with air apertures 0.13 cm in diameter supplied with air at 361° C. and between 0.56 to 1.25 kg/cm$^2$ pressure.

The two fiberizers, each with 21 nozzles on 0.76 cm centers were offset axially from each other by 0.38 cm, and were angled towards each other at an inclination of 13° from the vertical, with the distance between nozzle tips set at 1.42 cm. The two sets of intersecting fiber streams delivered the nylon 6/polyethylene-oxide-diamine copolymer resin at 344° C. at the rate of 0.61 grams per minute per nozzle. The fiber streams impinged over a distance of 4.1 cm (i.e., fiberizing die-to-collector distance=4.1 cm) on a 15 cm diameter by 137 cm long collection cylinder which was rotated at 512 rpm while it was simultaneously translated axially at the rate of 0.2 cm per revolution for the length of a single 124 cm stroke, thereby depositing on the surface of the collector cylinder a fibrous porous medium which was then slit lengthwise, trimmed at both ends, and then removed from the cylinder.

Four fibrous nonwoven webs were thus formed having dimensions of about 50 cm wide by 100 cm long with average fiber diameters of 2.5 μm, 5.6 μm, 8.1 μm, and 10.2 μm. Each of the four fibrous nonwoven webs had a voids volume of approximately 74% and a CWST of 92 dynes/cm. The properties of each of the four fibrous nonwoven webs are set forth in Table 1.

TABLE 1

| Sample | Air Pressure (kg/cm$^2$) | Thickness (cm) | Average Fiber Diameter (μm) |
|---|---|---|---|
| 1A | 1.25 | 0.030 | 2.5 |
| 1B | 1.16 | 0.019 | 5.6 |
| 1C | 0.81 | 0.019 | 8.1 |
| 1D | 0.56 | 0.020 | 10.2 |

Protein binding of each of the four fibrous nonwoven webs was determined using a radioactive assay in which 2.5 ml of a bovine serum albumin (BSA) solution containing 250,000 cpm of $^{125}$I BSA in a total of 250 μg of BSA in 10mM phosphate buffer of pH 7 and 0.1 M NaCl was pumped at the rate of 0.5 ml per minute through a 13 mm disc of each of the four fibrous nonwoven webs. Each disc was then analyzed for bound radioactivity in a gamma counter, from which the total amount of protein adsorbed onto the fibrous nonwoven web was then calculated.

As measured by the BSA protein-adsorption test each of the four fibrous nonwoven webs exhibited low protein adsorption, with adsorption for a 13 mm diameter disc ranging from about 8.3 μg (sample 1A) to 1.2 μg (sample 1D). Such low protein adsorption values demonstrate the usefulness of the present inventive method for many applications.

EXAMPLE 2

Another series of fibrous nonwoven webs was prepared in a manner similar to that set forth in Example 1. These fibrous nonwoven webs were evaluated, together with other, commercially available filtration media, by way of the BSA protein-adsorption test set forth in Example 1.

In particular, the BSA protein adsorption characteristics of four fibrous nonwoven webs prepared from nylon 6/polyethylene-oxide-diamine copolymer (samples 2A-2D) were compared with the BSA protein adsorption characteristics of a 0.2 μm pore rated nylon 66 membrane (sample 2E), a 0.2 μm pore rated Loprodyne® nylon 66 membrane with a radiation-grafted surface coating of hydroxypropylacrylate which exhibits low protein adsorption (Pall Corporation, East Hills, N.Y.) (sample 2F), and a 0.2 μm pore rated Durapore® polyvinylidene fluoride which similarly has a surface coating of a polymer which exhibits low protein adsorption characteristics (Millipore, Bedford, Mass.) (sample 2G). The results of this comparison are set forth in Table 2.

TABLE 2[1]

| Sample | Avg. Fiber Diameter (μm) | Voids Volume (%) | Avg. μm BSA/13 mm disc | Avg. μg BSA/cm$^2$ disc[2] | Max. μg BSA/cm$^2$ disc | Min. μg BSA/cm$^2$ disc |
|---|---|---|---|---|---|---|
| 2A | 4.7 | 81.2 | 5.8 | 4.4 | 5.7 | 3.0 |
| 2B | 4.7 | 81.2 | 6.0 | 4.5 | 5.6 | 3.9 |
| 2C | 4.8 | 86.6 | 6.8 | 5.1 | 5.7 | 3.9 |
| 2D | 17.0 | 78.3 | 2.3 | 1.7 | 2.6 | 1.3 |
| 2E | N/A[3] | N/A | 136.4 | 102.5 | 107.6 | 96.2 |
| 2F | N/A | N/A | 7.9 | 6.0 | 6.8 | 5.2 |
| 2G | N/A | N/A | 4.0 | 3.0 | 3.1 | 2.9 |

[1]all evaluations performed in triplicate (i.e., n = 3)
[2]avg. μg/cm$^2$ values based on 13 mm$^2$ diameter disc
[3]N/A = not applicable As is apparent from the results set forth in Table 2, the present inventive method is substantially superior to the filtration of protein-containing fluids through a nylon 66 filtration medium as regards protein binding. Moreover, the present inventive filtration method is at least as good as methods of filtering protein-containing fluids through commercially available filtration media which are specifically designed to exhibit low protein-adsorption but without the disadvantages associated with the use of such commercially available filtration media.

All of the references cited herein are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A method of treating a protein-containing fluid, which method comprises passing a protein-containing fluid through a fibrous nonwoven web comprising a polyamide-polyether copolymer.

2. The method of claim 1, wherein said fibrous nonwoven web has a critical wetting surface tension of at least about 72 dynes/cm.

3. The method of claim 2, wherein said polyamide is a nylon.

4. The method of claim 3, wherein said polyamide is nylon 6.

5. The method of claim 2, wherein said polyether is a polyetheramine.

6. The method of claim 5, wherein said polyetheramine is a polyalkylene-oxide-diamine.

7. The method of claim 6, wherein said polyalkylene-oxide-diamine is a polyethylene-oxide-diamine.

8. The method of claim 7, wherein said fibrous nonwoven web comprises a nylon 6/polyethylene-oxide-diamine copolymer.

9. The method of claim 8, wherein said fibrous nonwoven web has a critical wetting surface tension of at least about 80 dynes/cm.

10. The method of claim 9, wherein said nylon 6/polyethylene-oxide-diamine copolymer comprises 75–95 wt. % nylon 6 and 5–25 wt. % polyethylene-oxide-diamine.

11. The method of claim 10, wherein said nylon 6/polyethylene-oxide-diamine copolymer comprises 80–90 wt. % nylon 6 and 10–20 wt. % polyethylene-oxide-diamine.

12. The method of claim 11, wherein said nylon 6/polyethylene-oxide-diamine copolymer comprises 80–85 wt. % nylon 6 and 15–20 wt. % polyethylene-oxide-diamine.

13. The method of claim 8, wherein said fibrous nonwoven web consists of fibers having an average fiber diameter of about 20 μm or less.

14. The method of claim 6, wherein said fibrous nonwoven web has a critical wetting surface tension of at least about 80 dynes/cm.

15. The method of claim 14, wherein substantially all proteins contained within said fluid pass through said fibrous nonwoven web.

16. The method of claim 14 wherein said fluid becomes substantially protein-free after being passed through said fibrous nonwoven web.

17. The method of claim 1, wherein said fibrous nonwoven web has pore rating below about 10 μm.

18. The method of claim 17, wherein said fibrous nonwoven web has a pore rating of about 0.0 μm to about 5 μm.

19. The method of claim 1, wherein said fibrous nonwoven web consists of fibers having an average fiber diameter of about 20 μm or less.

20. The method of claim 19, wherein said fibrous nonwoven web consists of fibers having an average fiber diameter of about 10 μm or less.

21. The method of claim 19, wherein said fibrous nonwoven web has a voids volume of at least about 60%.

22. The method of claim 21, wherein said fibrous nonwoven web has a voids volume of about 70 14 90%.

23. The method of claim 21, wherein said fibrous nonwoven web has a thickness of about 0.01–0.1 cm.

24. The method of claim 1, wherein substantially all proteins contained within said fluid pass through said fibrous nonwoven web.

25. The method of claim 1, wherein said fluid becomes substantially protein-free after being passed through said fibrous nonwoven web.

26. A method of treating a protein-containing fluid, which method comprises passing a protein-containing fluid through a porous medium in the form of a fibrous nonwoven web or a membrane comprising a nylon 6-polyether copolymer and having a critical wetting surface tension of at least about 72 dynes/cm such that substantially all proteins contained within said fluid pass through said porous medium.

27. The method of claim 26, wherein said polyether is a polyetheramine.

28. The method of claim 27, wherein said polyetheramine is a polyalkylene-oxide-diamine.

29. The method of claim 28, wherein said polyalkylene-oxide-diamine is a polyethylene-oxide-diamine.

30. The method of claim 29, wherein said porous medium has a critical wetting surface tension of at least about 80 dynes/cm.

31. The method of claim 30, wherein said nylon 6/polyethylene-oxide-diamine copolymer comprises 75–95 wt. % nylon 6 and 5–25 wt. % polyethylene-oxide-diamine.

32. The method of claim 31, wherein said nylon 6/polyethylene-oxide-diamine copolymer comprises 80–90 wt. % nylon 6 and 10–20 wt. % polyethylene-oxide-diamine.

33. The method of claim 32, wherein said nylon 6/polyethylene-oxide-diamine copolymer comprises 80–85 wt. % nylon 6 and 15–20 wt. % polyethylene-oxide-diamine.

34. The method of claim 26, wherein said porous medium is a porous membrane.

35. The method of claim 26, wherein said porous medium has a pore rating below about 10 μm.

36. The method of claim 35, wherein said porous medium has a pore rating of about 0.01 μm to about 5 μm.

* * * * *

UNITED STATES PATENT AND TRADEMARK OFFICE
CERTIFICATE OF CORRECTION

PATENT NO.   :  5,714,073
DATED        :  February 3, 1998
INVENTOR(S)  :  David B. Pall, Thomas C. Gsell and Colin F. Harwood It is certified that error appears in the above-identified patent and that said Letters Patent is hereby corrected as shown below:

ON THE TITLE PAGE:

2nd Column, "FOREIGN PATENT DOCUMENTS":
The second entry is a duplicate and should be deleted.

In Column 2, line 58: "54,582,907" should read --5,582,907--.

IN THE CLAIMS:

In Claim 18, Column 6, line 62: "0.0" should read --0.01--.
In Claim 22, Column 7, line 4: "7014 90%" should read --70-90%--.

Signed and Sealed this

Fifth Day of May, 1998

Attest:

BRUCE LEHMAN

*Attesting Officer*   *Commissioner of Patents and Trademarks*